United States Patent [19]
Ruff

[11] Patent Number: 5,842,669
[45] Date of Patent: Dec. 1, 1998

[54] CRASHWORTHY SEAT

[75] Inventor: Stephen Anthony George Ruff, Chesham, United Kingdom

[73] Assignee: Martin-Baker Aircraft Company Limited, United Kingdom

[21] Appl. No.: 752,207

[22] Filed: Nov. 19, 1996

[30] Foreign Application Priority Data

Jun. 19, 1996 [GB] United Kingdom .................. 9612825

[51] Int. Cl.⁶ ................................................ B64D 25/04
[52] U.S. Cl. ............................. 244/122 R; 297/216.17; 188/375
[58] Field of Search ............................... 244/122 R, 121, 244/118.5; 297/216.1, 216.16, 216.17; 188/375

[56] References Cited

U.S. PATENT DOCUMENTS

| | | | |
|---|---|---|---|
| 3,532,379 | 10/1970 | Reilly et al. | 297/216 |
| 3,628,634 | 12/1971 | Valukonis | 188/375 |
| 3,779,591 | 12/1973 | Rands | 188/375 |

FOREIGN PATENT DOCUMENTS

| | | | |
|---|---|---|---|
| 0 078 479 | 5/1983 | European Pat. Off. | B64D 25/04 |
| 0838169 | 6/1979 | U.S.S.R. | 188/375 |
| 860841 | 2/1961 | United Kingdom . | |
| 998535 | 7/1965 | United Kingdom . | |

Primary Examiner—Galen L. Barefoot
Attorney, Agent, or Firm—Fulwider Patton Lee & Utecht, LLP

[57] ABSTRACT

A crashworthy seat comprises a sitting platform and a back. The sitting platform is supported by a frame adapted to be secured to the aircraft. The frame has upright members supporting the back of the sitting platform for vertical sliding movement under controlled resistance provided by an energy absorbing mechanism which comprises an elongate member extending along each upright and a cooperating cutting or deforming tool carried by the seat back. In a crash situation, the sitting platform slides downwardly under controlled resistance provided by the cutting tool cutting a shaving from the elongate member or by the deforming tool deforming the elongate member.

8 Claims, 4 Drawing Sheets

5,842,669

CRASHWORTHY SEAT

THIS INVENTION relates to a crashworthy seat for an aircraft or other vehicle, and is particularly, but not exclusively, concerned with crashworthy seats for helicopters.

Crashworthy seats for helicopters are intended to absorb in a non-injurious and controlled manner, the kinetic energy of the occupant due to more or less vertically downward movement of the aircraft and occupants. Accordingly, the desired effect of a helicopter crashworthy seat is to allow the occupant of the seat and the sitting platform, (that is to say the portion of the seat which engages the occupant's body and forms, in effect, a support or cradle for the occupant's body) to decelerate, in its downward movement, relatively gradually, as compared with the sudden deceleration of the aircraft itself upon striking the ground in a crash situation. Various forms of crashworthy seat have been proposed to meet these requirements.

It is an object of the present invention to provide an improved crashworthy seat.

According to one aspect of the invention, there is provided a crashworthy seat for an aircraft or other vehicle comprising a frame adapted to be secured to the aircraft or other vehicle and supporting a sitting platform, the frame supporting the sitting platform for sliding movement, in the direction of anticipated impact, under controlled resistance provided by an energy absorbing mechanism comprising an elongate member carried by the frame and a cooperating cutting or deforming tool carried by the sitting platform, or comprising an elongate member carried by the sitting platform and a cooperating cutting or deforming tool carried by the frame.

According to a preferred embodiment of the invention there is provided a crashworthy seat for a helicopter or other aircraft, comprising a frame adapted to be secured to the aircraft and supporting a sitting platform, having a back, the frame having an upright member or members supporting the back of the sitting platform for vertical sliding movement under controlled resistance provided by an energy absorbing mechanism, said energy absorbing mechanism comprising an elongate member extending along the upright member or members and a cooperating cutting or deforming tool carried by the said back, or comprising an elongate member extending along the seat back and a cooperating cutting or deforming tool carried by the upright member or members.

Embodiments of the invention are described below by way of example with reference to the accompanying drawings in which.

Figure 1:
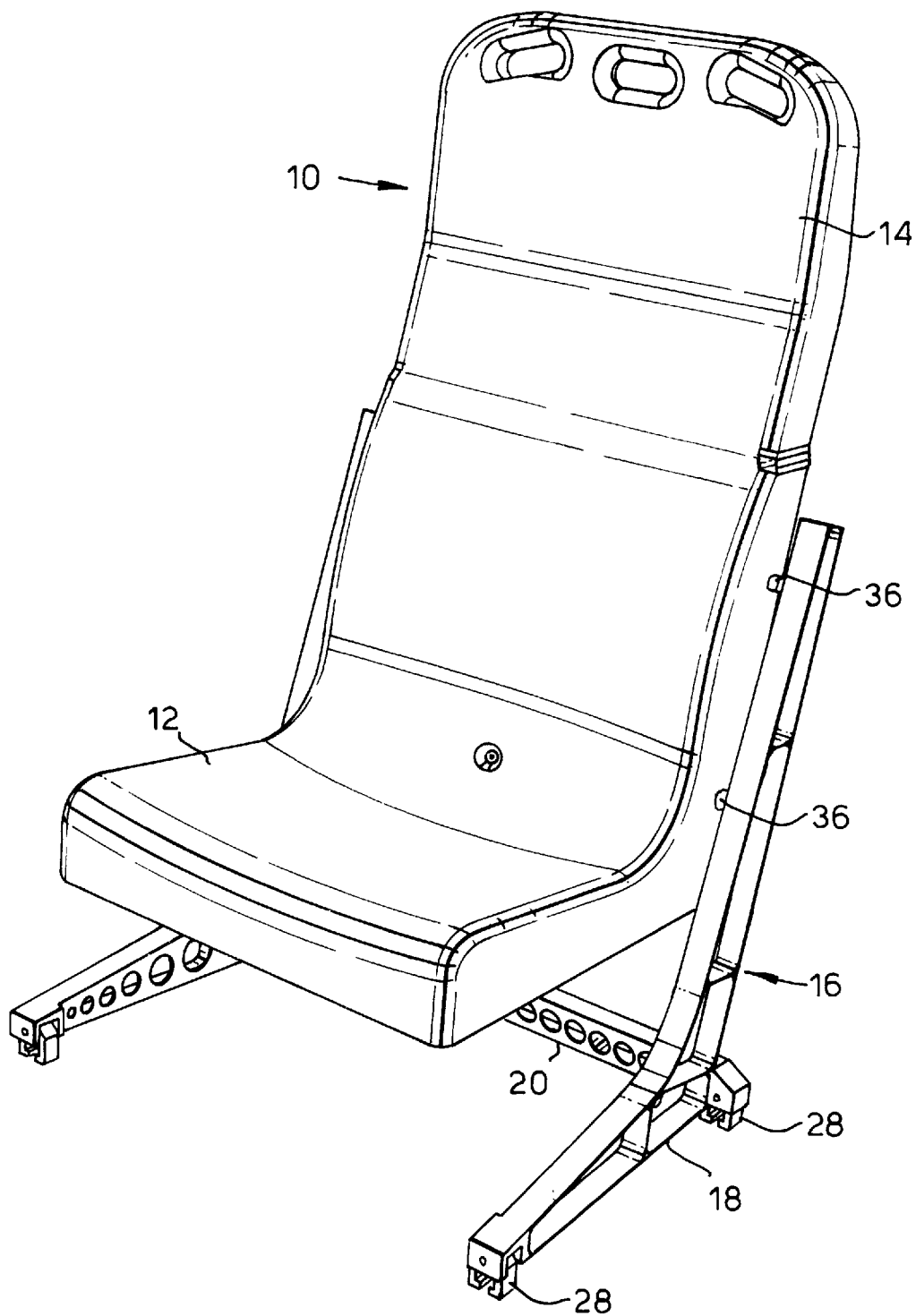
FIG. 1 is a perspective view of a helicopter crashworthy seat.

Referring to FIG. 1, the seat shown comprises a sitting platform or body support indicated generally at 10 and comprising an approximately horizontal bottom part 12 and an approximately vertical back 14. The sitting platform 10 is supported by a frame indicated generally at 16 and which, in the arrangement shown, comprises two transversely spaced apart approximately L-shaped side members 18 which may be connected by transversely extending structural members such as the spar 20 illustrated. The members 18 may be of metal, such as aluminium alloy or steel or may be of a composite material or of reinforced plastics. Each side member 18 includes an upright 24 (FIG. 2) extending upwardly with a slight rearward inclination and a generally horizontal foot portion 26. As best shown in FIG. 1, each foot portion 26 carries, at its opposite ends, the frame carried rail-engaging elements 28 which engage, in manner known per se, floor rails secured to or in the floor of the helicopter.

Whilst, in the arrangement shown in FIG. 1, the upright portions 24 of the side members 16 terminate intermediate the top and bottom of the seat back, it will be appreciated that in some alternative arrangements they may extend further vertically and may, indeed, extend above the seat back 14 to a ceiling structure or upper wall part of the aircraft cabin and be secured there. Likewise, it will be appreciated that, instead of the horizontal foot portions 26, the frame side members may incorporate rearwardly projecting parts which are secured to a rear wall of the aircraft cabin. Indeed, in general, any configuration for side members 16 may be adopted which provides adequate support for the uprights 24 in the desired positions and orientations and thereby adequate support via these uprights, for the sitting platform 10.

As will be apparent from what follows, the sitting platform is supported by the frame 16 for vertical sliding movement down the uprights 24 under controlled resistance provided by an energy absorbing mechanism described below.

Figure 2:
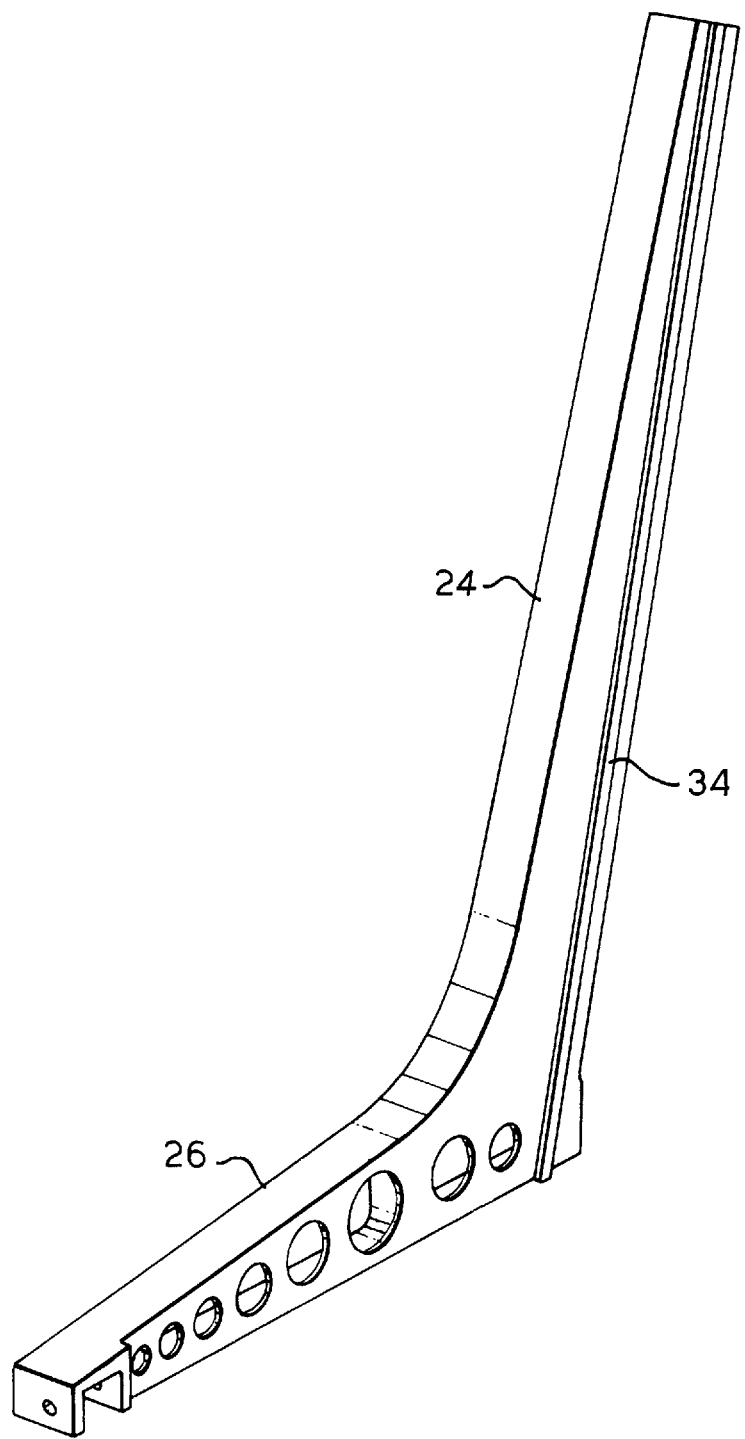
FIG. 2 is a perspective view of a side member of a frame of the seat.
Figure 4:
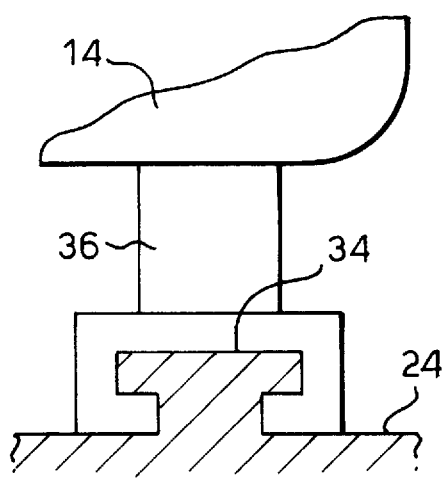
FIGS. 4 to 7 are fragmentary views, partly in section, of details.
Figure 5:
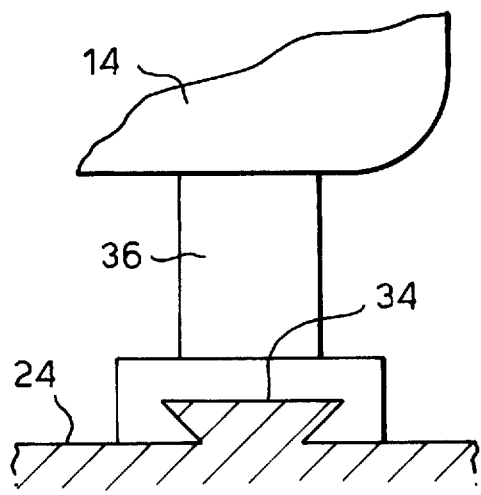

Referring to FIG. 2, there is provided on the inner face of each upright 24, an integral longitudinal rib 34 which may be of T-shape in cross section as shown in FIG. 4, or may be of dovetail-shape in cross section as shown in FIG. 5, or of other form which is wider further from the remainder of the side member than immediately adjacent the side member. Such a configuration of the rib 34, as described below, allows reliable retention of the sitting platform in normal circumstances by means of attachment members 36 of complementary form. However, if, for example, the uprights 24 on opposite sides of the seat-back are linked together by a tie or spar passing behind the back of the seat in manner not shown, the ribs 34 may be simply of square, rectangular or other cross sectional shape. Furthermore, it would be possible for the means for guiding the sitting platform for sliding movement in the frame to be provided as a mechanism separate and distinct from the means for providing an energy absorbing controlled resistance to such sliding movement.

Figure 6:
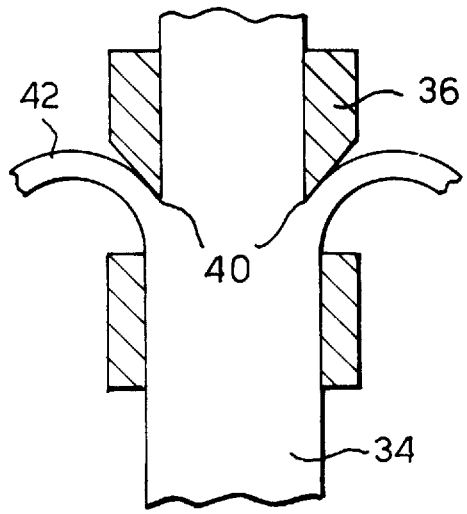
Figure 7:
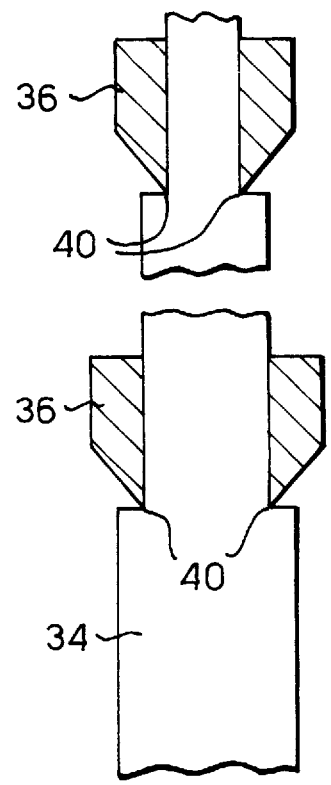

From the side faces of the seat back which face towards the uprights 24, on each side of the seat, extend respectively an upper mounting element 36 and a lower mounting element 36, each having, at its end remote from the seat back, a formation affording a through passage or channel of cross sectional shape approximately complementary to that of the rib 34 and receiving the same. In fact, as shown in FIG. 7, each mounting element 36 is normally engaged around a portion of its respective rib 34 which is of somewhat smaller cross section that the portions of the rib below that mounting element 36, or each element 36 has, as shown in FIG. 6, an upper portion which has a passage of smaller internal cross section than the portions of the rib 34 immediately below such upper portion and which smaller cross-section passage is engaged around a smaller cross section portion, of complementary size and shape, of the rib 34.

Figure 3:
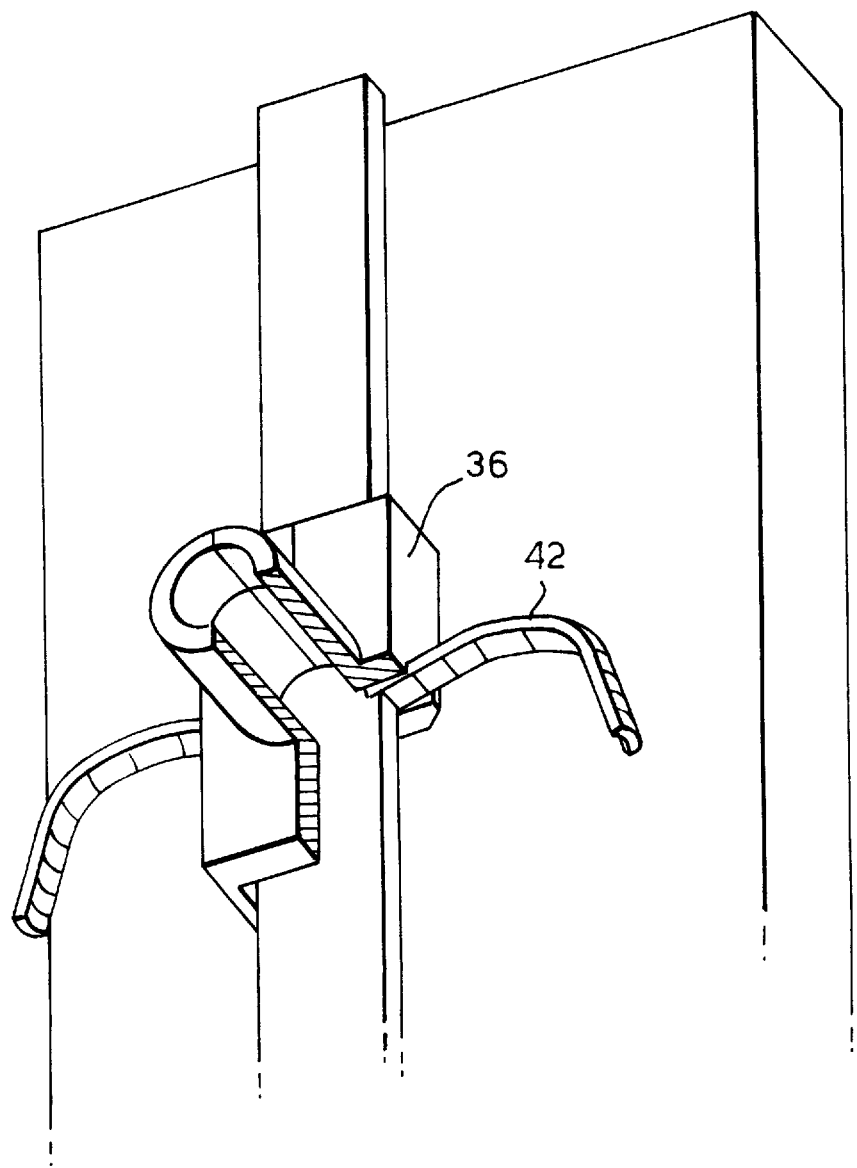
FIG. 3 is a schematic perspective view illustrating the operation of the energy absorbing mechanism for the crashworthy seat.

Conveniently, for a rib 34 of the cross sectional shape shown in FIG. 4, the cross sectional difference in question comprises a difference in the width of the cross-member of the "T" and there is provided, in the lateral edge regions of the element 36, at the bottom of the element (cf. FIG. 7) or at an intermediate level in the element, (cf. FIG. 6), a cutting edge 40 at the lower end of the (transversely) narrower part of the passage, for the cross member part of the "T", in the element 36. Accordingly, when the helicopter strikes the ground in a crash situation, the element 36, with the sitting platform, is forced downwardly along the frame uprights, and as this takes place material is planed or shaved off the lateral edges of the rib 34 as illustrated at 42 in FIGS. 3 and 6, thereby absorbing energy. The ribs 34 may, as illustrated in FIG. 7, be of different widths at different heights so that, normally, the lower element 36 engaged with each rib normally has its cutting edges 40 resting on a shoulder provided between the widest part of the rib 34 and a portion of intermediate width immediately above said widest portion, whilst the upper element 36 on each rib has its cutting edges resting on shoulders provided at the junction between the intermediate portion of the rib 34 and an upper narrowest portion of the rib 34. Thus, in crash-attenuating operation of the seat, both the upper and lower elements 36 plane or pare material 42 from the edges of their respective parts of the rib 34 to absorb energy. Alternatively, either the upper or the lower element 36 may be arranged simply to slide down the portions of the rib 34 immediately below in a crash-attenuating situation with energy absorption by trimming or planing material from the edges of the rib 34 being confined to the other element 36. It will be appreciated that, if desired, the arrangements described could be reversed with the elements 36 fixed to the uprights of the frame and the ribs 34 projecting from and being supported by the lateral sides of the seat back. (In such an arrangement, of course, the cutting edges of the element 36 would be directed upwardly and the wider portions of the ribs 34 would be above the narrower portions).

It will be appreciated that whilst, in the embodiment described, the energy-absorbing mechanism operates by trimming or planing edge portions of the ribs, energy absorption may alternatively or additionally be achieved by deformation of portions of the ribs 34. For example, the elements 36 may be configured so as to produce a bending of the edge portions of the ribs 34, such bending moving progressively downwards during crash attenuation (in the situation where the ribs 34 are provided in the uprights and the elements 36 on the seat back) or upwards, relative to the seat back (in the situation where the ribs 34 are carried by the sides of the seat back).

In a variant, (not shown), the rib along each upright 24 may be replaced by a groove or slot extending along the upright, (for example a slot of "T" shaped or dovetail-shaped cross-section), and the elements 36 described above may be replaced by elements received within said slot. In this case, the elements replacing the elements 36 may be arranged to expand the slot or deform the mouth of the slot when, in a crash situation, the sitting platform is forced downwardly along the frame uprights, or may be arranged to shave or plane material from the wall of such slot.

What is claimed is:

1. A crashworthy seat for an aircraft or other vehicle, comprising:
   a body support including a seat back and a generally horizontally extending bottom part, the seat back having two side edges and an upper and a lower mounting element extending from each of the side edges of the seat back, each mounting element having a channel;
   a frame adapted to be secured to the aircraft or other vehicle, said frame including two upright members, said seat back of the body support being located between and adjoining the two upright members, each upright member having an inner side and an elongate rib extending along the inner side of the upright member and facing the adjoining seat back, the rib of each adjoining upright member being engaged in the corresponding channel of said upper and lower mounting elements for supporting and guiding the seat back, the portion of each rib above each said mounting element having a smaller cross-section and the portion below each said mounting element having a larger cross-section and forming a shoulder on which a corresponding one of said mounting elements rests, each said mounting element having at least one cutting edge defining a portion of said channel and normally resting on a corresponding one of said shoulders, the frame supporting the body support for sliding movement along said upright members, in the direction of anticipated impact, whereby in a crash situation producing deceleration in a direction along said ribs, the body support is forced downwardly along the frame upright members to shave off the lower portions of the ribs, thereby absorbing energy and providing a controlled resistance to downward sliding movement of the body support along the uprights.

2. The crashworthy seat according to claim 1, wherein each said elongate rib has a T-shape in cross-section having a cross-member, and the channel of each said mounting element has a cross-section complementary with the portion of said rib which is received in said channel.

3. The crashworthy seat according to claim 2, wherein the differences in cross-sectional size of each rib above and below said mounting members comprise differences in width of said cross-member, whereby in a crash situation, as the body support is forced down between said upright members, material is planed off the lateral edges of the cross-member of the rib.

4. The crashworthy seat according to claim 1, wherein each said elongate rib has a dovetail shape in cross-section, and the channel of each said mounting element has a cross-section complementary with the portion of said rib which is received in said channel.

5. A crashworthy seat for an aircraft or other vehicle, comprising:
   a body support including a seat back and a generally horizontally extending bottom part, the seat back having two side edges and an elongate rib extending along each of the side edges of the seat back;
   a frame adapted to be secured to the aircraft or other vehicle, said frame including two upright members, said seat back of the body support being located between and adjoining the two upright members having inner side edges, each upright member having an upper and a lower mounting element extending from each of the side edges of the upright members, each mounting element having a channel, each of said ribs facing and adjoining a corresponding upright member, each adjoining rib being engaged in the corresponding channel of said upper and lower mounting elements for supporting and guiding the seat back, the portion of each rib below each said mounting element having a smaller cross-section and the portion above each said mounting element having a larger cross-section and forming a shoulder which rests on a corresponding one of said mounting elements, each said mounting element having at least one cutting edge defining a portion of said channel and normally rested on by a corresponding one of said shoulders, the frame supporting the body support for sliding movement along said upright members, in the direction of anticipated impact, whereby in a crash situation producing deceleration in a direction along said ribs, the body support is forced downwardly along the frame upright members to shave off the upper portions of the ribs, thereby absorbing energy and providing a controlled resistance to downward sliding movement of the body support along the uprights.

6. The crashworthy seat according to claim 5, wherein each said elongate rib has a T-shape in cross-section having a cross-member, and the channel of each said mounting element has a cross-section complementary with the portion of said rib which is received in said channel.

7. The crashworthy seat according to claim 6, wherein the differences in cross-sectional size of each rib above and below said mounting members comprise differences in width of said cross-member, whereby in a crash situation, as the body support is forced down between said upright members, material is planed off the lateral edges of the cross-member of the rib.

8. The crashworthy seat according to claim 5, wherein each said elongate rib has a dovetail shape in cross-section, and the channel of each said mounting element has a cross-section complementary with the portion of said rib which is received in said channel.

* * * * *